Figure 1:
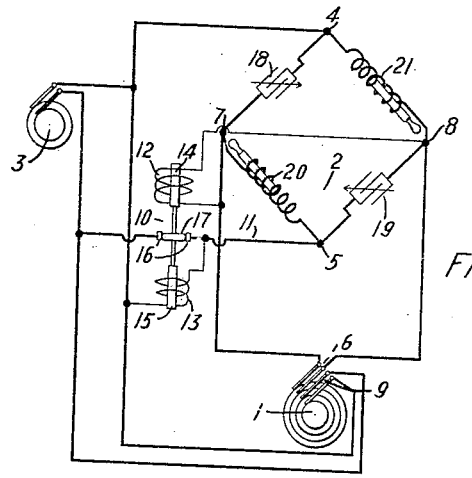

M. HARTENHEIM.
PROTECTIVE MEANS FOR BRIDGE TYPE PHASE SPLITTERS.
APPLICATION FILED FEB. 10, 1916.

1,293,767.

Patented Feb. 11, 1919.

WITNESSES:
Fred A. Lind.
Geo. W. Hansen.

INVENTOR
Max Hartenheim
BY
Wesley G. Carr
ATTORNEY

UNITED STATES PATENT OFFICE.

MAX HARTENHEIM, OF PITTSBURGH, PENNSYLVANIA, ASSIGNOR TO WESTINGHOUSE ELECTRIC AND MANUFACTURING COMPANY, A CORPORATION OF PENNSYLVANIA.

PROTECTIVE MEANS FOR BRIDGE-TYPE PHASE-SPLITTERS.

1,293,767. Specification of Letters Patent. Patented Feb. 11, 1919.

Application filed February 10, 1916. Serial No. 77,405.

*To all whom it may concern:*

Be it known that I, MAX HARTENHEIM, a subject of the Emperor of Germany, and a resident of Pittsburgh, in the county of Allegheny and State of Pennsylvania, have invented a new and useful Improvement in Protective Means for Bridge-Type Phase-Splitters, of which the following is a specification.

My invention relates to alternating-current distributing systems and especially to systems whereby polyphase apparatus, such as motors, generators, rotary converters and the like, may operate on single-phase circuits, through the intermediary of phase-splitting devices.

An object of my invention is to provide protective means associated with phase-splitting devices which are of the bridge-type, whereby the said devices are protected against excessive voltage stresses or strains to which they may be subjected when unbalanced load conditions obtain in the separate phases of the associated circuits.

It is well known that, when four elements of equal reactance, two being condensive and two being inductive, are connected in a closed circuit so as to alternate in position with one another, and a potential of the proper frequency is impressed across two opposite points of the closed circuit, a current of constant value may be obtained in a circuit that is connected across the other two opposite points of the closed circuit. This system of connections has been designated a mono-cyclic square in which the current flowing in the constant-current circuit is maintained, under certain conditions, 90 degrees out of phase with the constant voltage impressed upon the square by the constant-potential circuit.

It has been proposed to modify the aforementioned mono-cyclic square arrangement in order to utilize the same as a phase-splitting device whereby a polyphase motor, generator, rotary converter and the like, may be operated from a single-phase circuit by reason of the phase modification effected by this modified arrangement of the mono-cyclic square, which I will designate as a bridge. In this bridge-arrangement, the several reactances are so adjusted that, when a voltage of a certain predetermined frequency is impressed across one diagonal of the bridge, an equal voltage of the same frequency may be obtained from the other diagonal of the bridge, said second voltage being displaced 90 degrees in phase relationship from the said first voltage. It will be noted, therefore, that two voltages are available for operating a polyphase apparatus which are in strict polyphase relationship; that is, they are equal to, and displaced 90 degrees in phase relationship from, each other. When no control systems for the bridge are provided, as in the present arrangement, this balancing of the voltage is maintained only when the load upon the motor is constant, or when the currents supplied to the several phases of the motor or apparatus are equal in value, which condition obtains only when the load is maintained at a predetermined value. The reactances of the bridge are consequently selected in accordance with the phase-currents necessary for sustaining this predetermined load.

As the load upon the motor varies, resulting in a change in the current or currents supplied thereto, the voltage impressed across the bridge phase of the motor will change likewise, which may cause an abnormal difference of potential to exist across the corresponding diagonal of the bridge. The balance between the voltages impressed upon several phases of the motor will be consequently disturbed which results from this distortion of the voltage, both in value and phase. As a result of this distortion in the voltages, unequal currents flow in the several phases of the motor. Again, the potential difference across one diagonal of the bridge may be sufficient to destroy the insulating properties of the reactance elements comprising the bridge.

In order to maintain a balanced condition between the voltages impressed upon the several phases of the apparatus through the intermediary of the bridge arrangement, under all load conditions, it is necessary to maintain the potentials of the four corners of the bridge equal in value, and this may be effected if the values of the capacity reactance elements are varied in direct proportion to the current supplied in the bridge-fed phase of the motor, while the values of the inductance elements, at the same time, are varied in inverse proportion thereto. To automatically effect this control of the values of the reactance elements comprising a bridge arrangement of the aforementioned character, irrespective of the load conditions imposed upon the polyphase apparatus, I have invented the control system shown and described in my co-pending application, Serial No. 77,404, filed Feb. 10, 1916, by means of which the voltages impressed upon the several phases may be automatically maintained balanced.

Figure 2:
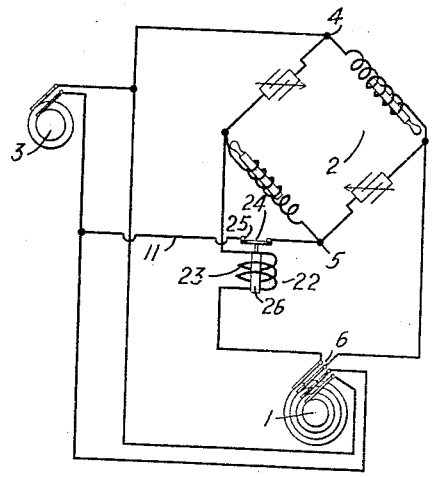
Figure 3:
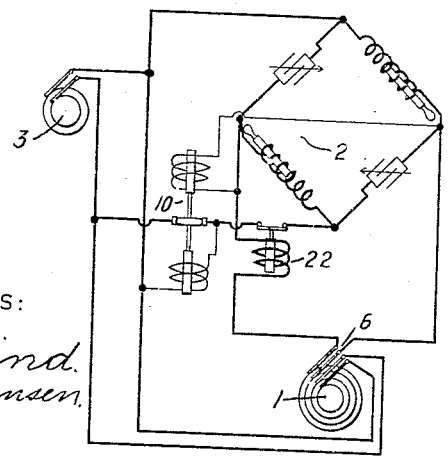

For a better understanding of the scope of my invention, reference may be had to the following description and the accompanying drawing in which Figure 1 is a diagrammatic representation of an alternating-current system embodying a form of my invention, and Figs. 2 and 3 are modified forms of the system shown in Fig. 1.

Referring to Fig. 1, a polyphase apparatus 1, represented as a two-phase motor, is connected through a bridge arrangement 2 to a source of single-phase supply 3. The single-phase alternator 3 is connected to diagonally-opposite corners 4 and 5 of the bridge arrangement 2, thereby impressing a single-phase electromotive force upon the bridge. The phase 6 of the two-phase apparatus 1 is connected to diagonally-opposite corners 7 and 8 of the bridge, and the other phase 9 of the two-phase motor is connected directly to the source of single-phase supply 3. A disconnecting switch 10 is connected in the lead 11 which connects the bridge 2 to the source of power supply 3. The disconnecting switch 10 is similar to a differential relay-device having a coil 12 and a coil 13, each acting upon independent core members 14 and 15, respectively. Contact members 16 of the relay device 10 are bridged by a conducting member 17 which is adapted to move upwardly or downwardly according to the preponderance of the magnetic attraction resulting from either the coil 12 or the coil 13, as will be hereinafter explained.

The bridge 2 comprises a series of condensive reactance elements 18 and 19 and inductive reactance elements 20 and 21, the elements of different characteristics alternating in position, as shown, to form a closed circuit. The electrical constants of the several elements comprising the bridge 2 are preferably so adjusted that, when an electromotive force of a predetermined frequency is impressed across the corners 4 and 5 of the bridge, the reactance voltage drops in the several arms of the bridge are equal, the phase relationship between the voltage-drops in adjacent arms, however, being displaced 180 degrees from each other by reason of the condensive and inductive characteristics imparted to the separate arms of the bridge.

We will assume, for convenience, that, under normal load conditions upon the motor 1, the bridge 2 maintains the voltages impressed upon the several phases of the motor 1 balanced; that is, equal in value to, and displaced 90 degrees in phase relationship from, each other. To state more generally, the voltages impressed upon the several phases of the polyphase apparatus 1 are maintained in strict polyphase relationship, under normal load conditions, by reason of the proper relationship existing between the electrical constants of the various elements comprising the bridge 2. As the load upon the motor 1 increases, the currents delivered to the various phases thereof must necessarily increase in value. The variations in the current supplied to the bridge-fed phase of the motor 1 will effect distortions in the potential differences existing between the diagonally opposite corners of the bridge 2. If the load upon the motor varies beyond the certain predetermined range within which it is possible to automatically adjust the electrical constants of the elements of the bridge, as explained in the co-pending application above mentioned, the voltage impressed across one of the diagonals of the bridge, that is, the modified-phase diagonal, will become distorted to such an extent that the elements of the bridge may be subjected to abnormally high or break-down voltages. For instance, this abnormal distortion of the voltage across the corners 7 and 8 of the bridge may occur when the motor 1 is used for regenerating purposes. In this case, the decreasing load upon the motor, as it approaches synchronism, results in a decreased current supplied thereto which results in an unduly high potential difference being established between the corners 7 and 8 of that diagonal of the bridge to which the bridge-fed phase 6 of the motor is connected.

To protect the bridge against this abnormal distortion of voltage, the differential relay 10 is supplied. Under normal conditions of operation, the current flow through the coils 12 and 13 is equal, since the coils are respectively connected across the two diagonals of the bridge, thereby subjecting them to equal current flow as a result of the equally impressed voltages. It will be apparent that, under this condition, the bridging member 17 is maintained in the position shown since the magnetic attractions upon the core members 14 and 15 neutralize each other. If, however, the bridge becomes distorted, as mentioned above, the particular coil of the differential relay 10 having the greater voltage impressed thereupon, will influence its associated core member to overbalance the magnetic attraction influencing the other core member, thereby moving the bridging member 17 upwardly or downwardly according to the coil producing the preponderating magnetic attraction. The bridge 2 will, therefore, be disconnected from the source of supply 3, while the bridge-fed phase 6 of the motor will remain connected to the bridge which, in this capacity, may serve as a brake during the regenerating operation of the motor. In this circumstance, the motor 1 will regenerate as a single-phase generator, the generating phase constituting the bridge-fed phase 6 which is connected to the bridge 2.

In Fig. 2, the bridge 2 is protected by means of a relay device 22 having its coil 23 connected in series circuit with the bridge-fed phase 6 of the motor 1. A bridging member 24 bridges contact members 25 which are inserted in the lead 11 of the single-phase generator 3. Under normal conditions of operation, the current flow through the coil 23 is sufficient to maintain the bridging member 24 in engagement with the contact members 25, thereby connecting the single-phase alternator 3 to the points 4 and 5 of the bridge 2. When the motor 1 regenerates and approaches synchronous speed, the current flowing in the bridge-fed phase 6 will decrease to a very small value, thereby permitting a core member 26 of the relay 22 to advance downwardly because of the deënergization of the magnetizing coil 23. The bridge 2 will, therefore, be disconnected from the alternator 3, as explained in connection with Fig. 1, while, at the same time, the bridge-fed phase 6 of the motor 1 will be connected across the bridge which acts as a break for the regenerating single-phase of the generator, formerly the bridge-fed phase 6 of the motor.

In Fig. 3, I have shown a system whereby the bridge 2 is protected by a combination of the protective devices shown in Figs. 1 and 2. In this instance, the differential relay 10 and the relay 22 are connected in circuit as explained above in detail. The relay 10 will operate to disconnect the bridge 2 from the source of power supply 3 when the voltages across the two diagonals of the bridge 2 become abnormally unbalanced and, likewise, the relay 22 will disconnect the bridge from the source of power supply when the current flowing in the bridge-fed phase 6 of the motor 1 falls to a predetermined low value. In either instance, it will be observed that the bridge 2 is maintained connected across the bridge-fed phase 6 of the motor 1, thereby acting as a break for the same during regenerating operations.

It will be noted that my description mentions only two-phase polyphase circuits in combination with single-phase circuits, but my invention has broader applications than this, as will be readily understood. Moreover, my system is such that the polyphase circuit may be considered as the one supplying power to the bridge 2 while the single-phase circuit constitutes the power-consuming circuit, this inversion of the circuits being apparent to those skilled in the art and not affecting, in any way, the operation of the protective devices described.

While I have shown and described several embodiments of my invention, it will be understood that many more modifications may be made therein without departing from the spirit and scope of the appended claims.

I claim as my invention:

1. The combination with a single-phase circuit, and a polyphase circuit, of a phase-splitting device for interconnecting said circuits with each other, and means for disconnecting said phase-splitting device from the single-phase circuit only when unbalanced load conditions obtain in the polyphase circuit.

2. The combination with a single-phase circuit, and a polyphase circuit, of a phase-splitting device for interconnecting said circuits with each other, and means influenced by the current flow in the phase supplied with alternating current from said phase-splitting device for disconnecting the phase-splitting device from the other phases of the circuits.

3. The combination with a single-phase circuit, and a polyphase circuit, of a phase-splitting bridge comprising inductive and condensive reactance elements alternating in position with one another in a closed circuit for interconnecting said circuits with each other, and means for automatically disconnecting said phase-splitting bridge from all of the circuits, excepting that phase supplied with alternating current from the phase-splitting bridge, when unbalanced potential differences obtain between the two diagonals thereof.

4. The combination with a single-phase dynamo-electric machine and a polyphase dynamo-electric machine, of a phase-splitting device for interconnecting said machines to each other, and means controlled by abnormal conditions obtaining in one phase of one of said machines for disconnecting said phase-splitting device from the other phases of said machine during regenerating operations of said phase-connected machine only.

5. The combination with a single-phase dynamo-electric machine and a polyphase dynamo-electric machine, of a phase-splitting bridge comprising inductive and condensive reactance elements alternating in position with one another in a closed circuit for interconnecting said machines with each other, and means for disconnecting said phase-splitting device from the power-supply machine when abnormal load conditions obtain.

6. The combination with a single-phase dynamo-electric machine and a polyphase dynamo-electric machine, of a phase-splitting bridge comprising inductive and condensive reactance elements alternating in position with one another in a closed circuit for interconnecting said machine with each other, and means for automatically disconnecting said phase-splitting device from the power supply machine when the voltage across one of the diagonals of said phase-splitting bridge varies beyond a predetermined value.

In testimony whereof, I have hereunto subscribed my name this 4th day of Feb., 1916.

MAX HARTENHEIM.